(12) United States Patent
Cook

(10) Patent No.: US 9,192,097 B2
(45) Date of Patent: Nov. 24, 2015

(54) FLOOR SEAL FOR A CENTER KNIFE DRIVE FOR A SICKLE OF A PLANT CUTTING MACHINE

(75) Inventor: Joel T. Cook, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 75 days.

(21) Appl. No.: 14/126,349

(22) PCT Filed: Jun. 18, 2012

(86) PCT No.: PCT/US2012/042954
§ 371 (c)(1),
(2), (4) Date: Dec. 13, 2013

(87) PCT Pub. No.: WO2012/174530
PCT Pub. Date: Dec. 20, 2012

(65) Prior Publication Data
US 2014/0109540 A1    Apr. 24, 2014

Related U.S. Application Data

(60) Provisional application No. 61/520,895, filed on Jun. 16, 2011.

(51) Int. Cl.
*A01D 34/13* (2006.01)
*A01D 34/40* (2006.01)
*A01D 34/30* (2006.01)

(52) U.S. Cl.
CPC ............... *A01D 34/40* (2013.01); *A01D 34/30* (2013.01)

(58) Field of Classification Search
CPC ..... A01D 34/13; A01D 34/135; A01D 34/16; A01D 34/17; A01D 34/18; A01D 34/20; A01D 34/22; A01D 34/404; A01G 2003/0461
USPC .......................... 56/296, 320.1, 297, 298, 299
See application file for complete search history.

(56) References Cited

U.S. PATENT DOCUMENTS

| | | | |
|---|---|---|---|
| 47,022 A | 3/1865 | Jennings | |
| 1,165,169 A * | 12/1915 | Hamel | ............................. 56/296 |
| 1,567,013 A | 12/1925 | Rutishauser | |
| 1,622,299 A | 3/1927 | Wanamaker | |
| 2,161,357 A | 6/1939 | Kaplan | |
| 2,232,823 A * | 2/1941 | Le Grand | ......................... 56/283 |
| 2,332,840 A | 10/1943 | Boyer | |

(Continued)

FOREIGN PATENT DOCUMENTS

EP          0035805 A2      9/1981

*Primary Examiner* — Árpád Fábián-Kovács
(74) *Attorney, Agent, or Firm* — Patrick M. Sheldrake; Seyed V. Sharifi T.

(57) ABSTRACT

A floor seal for a forwardly facing opening through a floor of a plant cutting machine through which a knife arm extends for side to side reciprocating movement for driving a sickle of the machine as the machine is moved forwardly for performing a plant cutting operation. The floor seal includes a stationary outer peripheral seal element engaged with a peripheral edge of the floor about the opening and carrying a cover element in covering relation to the opening about the knife arm and defining and bounding a forwardly facing aperture containing the knife arm and an inner peripheral seal element carried in the aperture by the cover element bounding and forming a barrier to entry of loose material or sealed condition about the knife arm and movable side to side therewith relative to the outer seal and cover.

18 Claims, 12 Drawing Sheets

(56) References Cited

U.S. PATENT DOCUMENTS

| | | | |
|---|---|---|---|
| 2,515,343 A | 7/1950 | Gravely | |
| 2,624,999 A * | 1/1953 | Goodnight | 56/10.4 |
| 2,687,000 A * | 8/1954 | Valentine | 56/299 |
| 2,687,001 A * | 8/1954 | Valentine | 56/299 |
| 3,098,338 A * | 7/1963 | Myers | 56/296 |
| 3,114,230 A * | 12/1963 | Blaauw | 56/297 |
| 3,151,434 A * | 10/1964 | Hamel | 56/296 |
| 3,517,495 A | 6/1970 | Beusink | |
| 3,760,571 A * | 9/1973 | Foster | 56/298 |
| 3,952,486 A | 4/1976 | Bryant | |
| 4,023,334 A | 5/1977 | Heath | |
| 4,198,803 A * | 4/1980 | Quick et al. | 56/296 |
| 4,418,520 A * | 12/1983 | Schneider et al. | 56/297 |
| 6,889,492 B1 | 5/2005 | Polk et al. | |
| 7,472,533 B2 | 1/2009 | Talbol et al. | |
| 7,478,522 B1 * | 1/2009 | Lovett et al. | 56/296 |
| 7,520,118 B1 | 4/2009 | Priepke | |
| 7,600,364 B2 | 10/2009 | Lovett et al. | |
| 7,730,709 B2 | 6/2010 | Priepke | |
| 7,805,919 B2 | 10/2010 | Priepke | |
| 7,810,304 B2 | 10/2010 | Priepke | |
| 7,921,627 B2 * | 4/2011 | Sauerwein et al. | 56/181 |
| 7,958,711 B1 | 6/2011 | Sauerwein | |
| 8,011,272 B1 | 9/2011 | Bich et al. | |
| 8,151,547 B2 | 4/2012 | Bich et al. | |
| 8,484,939 B1 * | 7/2013 | Cormier et al. | 56/181 |
| 2009/0145097 A1 * | 6/2009 | Priepke | 56/257 |

\* cited by examiner

FLOOR SEAL FOR A CENTER KNIFE DRIVE FOR A SICKLE OF A PLANT CUTTING MACHINE

CROSS REFERENCE TO RELATED APPLICATIONS

This application is the US National Stage for International Application No. PCT/US2012/042954, filed on Jun. 18, 2012, which itself is related to and claims the benefit of U.S. Provisional Application No. 61/520,895, filed Jun. 16, 2011.

TECHNICAL FIELD

This invention relates generally to a seal for preventing of entry of loose plant residue and other undesired material through an opening through a floor of a plant cutting machine through which a moving knife arm connecting with a sickle of the machine extends, and more particularly, which includes an element or elements that form a barrier that moves with the knife to prevent or limit entry of crop, plant residue, dirt, dust and other loose material into the opening during side to side movements of the knife arm, to reduce accumulation of the material on a drive or drives of the sickle located in a cavity behind the opening.

BACKGROUND ART

The disclosure of U.S. Provisional Application No. 61/520,895, filed Jun. 16, 2011, is hereby incorporated herein in its entirety by reference.

Sickles typically including cutter bars supporting a row of knives, have been used to cut plants, including, but not limited to, hay, grasses, small grains and the like, for many years. The knives are composed of a plurality of knife or sickle sections which are mounted in side by side relation forming an elongate metal knife assembly. The elongate knife assembly is normally supported so as to slide longitudinally along an elongate stationary bar that has forwardly projecting, spaced apart guards bolted to a structural beam or knife back. The knife assembly moves back and forth in a reciprocating movement to move the knives relative to the guards so that the leading knife edges of the knives cross over the guards or through slots in the guards. This produces a shearing or cutting action which severs plant stems and stalks or other material captured between the knives and the guards.

In a harvesting machine, such as a combine or windrower, the knife assembly and stationary bar are typically supported in connection with a cutting head or header, and are oriented so as to extend sidewardly along a forward edge portion of structure such as a floor or pan of the header, hereinafter sometimes referred to generally as the floor. The floor or pan defines the lower periphery of a cut crop or plant flow area, which can include conveying apparatus, such as one or more augers or belts, operable in cooperation with a reel in machines so equipped, for conveying the cut plant material and crops, for instance, to a feeder inlet of a combine or windrow forming apparatus of a windrower.

Historically, many known sickle knife or cutter drive mechanisms have been located on the side end of the sickle, and connect to the knife assemblies utilizing connecting rods or Pitman arms, such as illustrated in Wanamaker U.S. Pat. No. 1,622,299, issued Mar. 29, 1927, and Boyer U.S. Pat. No. 2,332,840, issued Oct. 26, 1943. More recent known sickle drives are located in or below the floor or pan of a header or plant cutting machine, and are sometimes referred to as center drives or center knife drives, as shown in Priepke U.S. Pat. Nos. 7,810,304; 7,805,919; 7,730,709; 7,520,118; and 7,401,458, and Bich U.S. Pat. Nos. 8,011,272 and 8,151,547. Center knife drives such as these are advantageous as they are compact, and provide an efficient manner of translating epicyclic or crank motion to side to side knife motion.

A problem observed with the above center knife drives and other center drives such as pivotally driven drives, is that because of their location in or below the floor or pan, the drives are at least partially contained in a relatively low profile or flat housing or cover, on which loose crop material or residue and other undesirable material such as dust, dirt, and debris, can collect or accumulate. This is undesirable, as the material, if allowed to accumulate, can insulate the drive to reduce dissipation of heat generated by operation of the drive so as to possibly result in overheating and premature failure of drive components such as bearings.

As another problem, accumulated material can become lodged between the drive and underside of the floor or pan, and can even be compacted into a solid mass, so as to limit or prevent upward movement of the drive. This can be problematic, for instance, if the drive is used with a cutter bar and sickle that can flex upwardly, and wherein the sickle can be configured in a float mode so as to be movable upwardly toward the floor or pan. As another possible problem, some crop can be lost through openings or apertures of the floor or pan through which knife arms or other elements connecting with the knife assemblies pass.

Reference Rutishauser U.S. Pat. No. 1,567,013, which discloses an apparatus operable for preventing accumulation of material on a lever or knife arm of a sickle drive. The Rutishauser patent accomplishes this using a triangular distributing member that is pivoted back and forth over the lever to deflect and distribute the material cut by the sickle to the sides of the lever, which are open to allow the material to fall to the ground below. This keeps the cut material from collecting on the lever, but does not appear to have utility for preventing or substantially limiting passage of loose material through an opening or aperture in a floor of a plant cutting machine through which a side to side moving lever or knife arm extends.

As still another problem, the openings in a floor of a plant cutting machine through which the knife arms or levers driving a sickle extend, are typically located in a curved or tapered forward edge region of the floor or pan, so as to be at least partially forwardly facing, so as to be directly in the flow of cut crop and other loose material when the machine is moving forward during a plant cutting operation, and so as to be susceptible to having the loose material become trapped or jammed between the sides of the openings and the knife arms or levers which can cause increased stress loads on the drives and resultant wear and damage.

Thus, what is sought is a durable floor seal for preventing or limiting passage of loose material through an opening in a floor or pan of a plant cutting machine through which a knife arm or lever driving a sickle extends and moves in a side to side reciprocating manner, and which overcomes one or more of the problems set forth above.

SUMMARY OF THE INVENTION

What is disclosed is a durable floor seal for preventing or limiting passage of loose material through an opening in a floor or pan of a plant cutting machine through which a knife arm or lever driving a sickle extends and moves in a side to side reciprocating manner, and which overcomes one or more of the problems, set forth above.

According to a preferred aspect of the invention, the floor seal can be of multiple component or unitary construction, and includes an outer peripheral seal element that is stationary relative to the floor and cooperatively engages a peripheral edge of the floor about the opening, forming a substantially sealed condition thereabout, that is, a condition sufficient to prevent entry of loose crop material, dust, dirt and the like under typical plant cutting conditions. The floor seal includes an inner peripheral seal element bounded by the outer peripheral seal element. The inner peripheral seal element cooperatively engages an outer peripheral surface of the knife arm forming a substantially sealed condition thereabout to prevent entry of cut crop and the other loose material mentioned above, and is movable side to side with the knife arm. The floor seal additionally includes an intermediate cover element extending between the outer and inner peripheral seal elements, configured to provide an enclosure or barrier to passage of loose material between the seal elements while allowing the side to side movements of the inner peripheral seal element with the knife arm relative to the outer peripheral seal element.

As an attendant advantage of the invention, the three elements of the floor seal combine to prevent passage of loose material through the floor opening, and is sufficiently durable so as not to fail when exposed to a flow of cut crop and other material about the seal. As non-limiting examples the flow of material can comprise a mixture of crop, leaves, and stalks, the latter of which can be stiff and woody. The cover element is preferably configured to deflect the flow of material away from the inner peripheral seal and can have a tapered, curved or other shape effective for this purpose. As another non-limiting example, the cover element can have a tapered shape that extends convergingly forwardly toward an aperture enclosed by the inner peripheral seal and the knife arm or lever, and the inner seal can be recessed in the aperture so as to be at least partially shielded and protected from damaging contact with cut plant material. As a further non-limiting example, the cover element can be of rigid, hard construction and provide an elongate aperture in which the inner peripheral seal is carried for side to side movement with the knife arm. In this embodiment the inner peripheral seal can be carried in one or more slots that are open at the ends so as to be effectively self cleaning by the movements of the inner seal, and which can be configured to allow some limited up and down movement of the inner seal element for facilitating relative upward and downward movements of the floor and knife arm, e.g., to accommodate use with a flexible cutter bar and/or sickle with a vertical float capability.

As one preferred embodiment of the invention the outer peripheral seal element and cover element are constructed of a hard, wear resistant material such as a hard plastics material, and the inner peripheral seal is of a more flexible material such as a rubbery material to accommodate the movements of the knife arm without cracking or breaking. As an alternative preferred embodiment the floor seal is constructed of a more flexible rubber or rubbery material, with the inner peripheral seal element integral with the cover element but recessed in the aperture of the cover and flexibly movable relative thereto to facilitate the side to side and other limited movements of the knife arm.

Still further, the components of the floor seal are configured for ease of removal and replacement, such as during routine service of the knife arm and related apparatus.

DETAILED DESCRIPTION OF THE INVENTION

Figure 1:
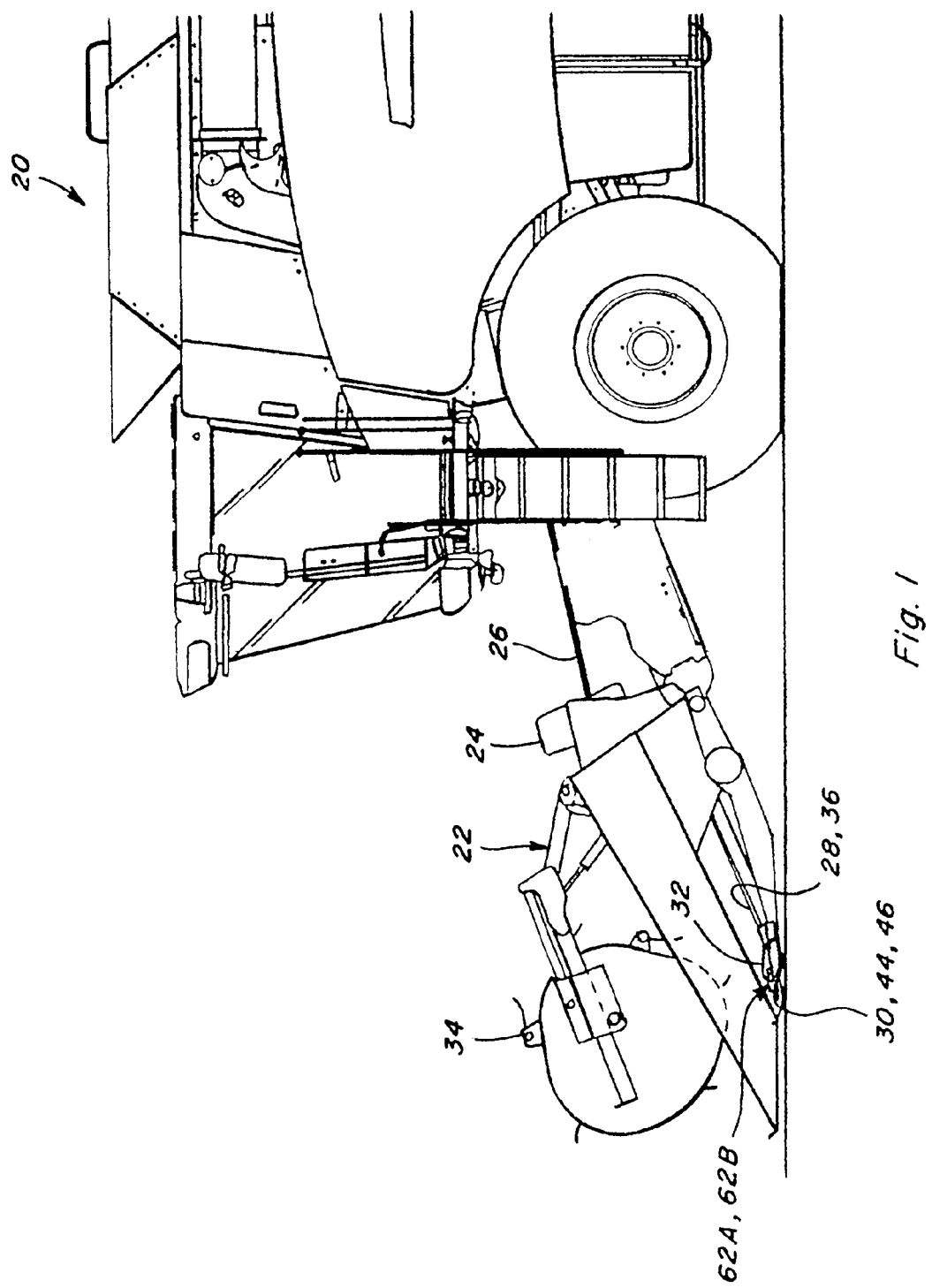
FIG. 1 is a fragmentary side view of a harvester including a header including knife arms extending forwardly through openings in a floor of the header, with which the floor seals according to the invention can be used.
Figure 2:
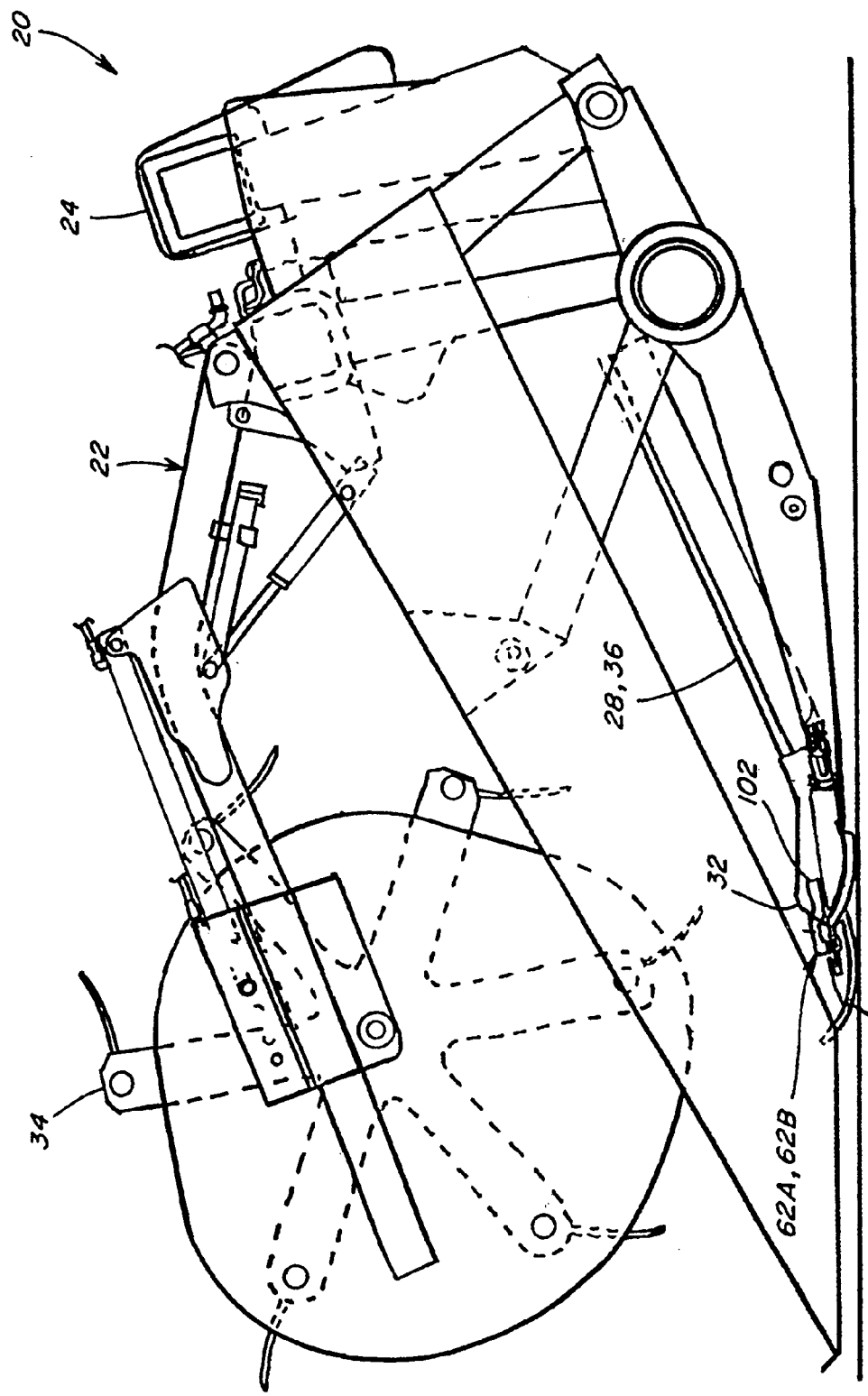
FIG. 2 is an enlarged fragmentary side view of the header of FIG. 1.

Turning now to the drawings wherein preferred embodiments of the invention are shown, in FIGS. 1 through 4, a conventional, well known agricultural cutting machine, which is a combine 20, is shown including a header 22. Header 22 is shown supported in the conventional, well-known manner on a forward end 24 of combine 20, and is operable for cutting or severing crops such as, but not limited to, small grains such as wheat and soybeans, and inducting the severed crops into a feeder 26 for conveyance into combine 20 for threshing and cleaning, in the well known manner, as combine 20 moves forwardly over a field.

Header 22 includes a pan or floor 28 which is supported in desired proximity to the surface of the field during the harvesting operation, and an elongate, sidewardly extending sickle 30 along a forward edge portion 32 of floor 28, sickle 30 being operable for severing the plants or crop for induction into header 22, as will be explained. Header 22 additionally includes an elongate, sidewardly extending reel 34 disposed above sickle 30 and rotatable in a direction for facilitating induction of the severed plant material or crops into header 22. Here, header 22 is configured as a draper type, having a system of elongate, flat, sidewardly moving draper belts 36 and 38 having upwardly facing surfaces disposed just rearwardly of forward edge portion 32, operable in cooperation with reel 34 for conveying the severed plant material or crops toward an inlet opening of feeder 26 for induction into combine 20, in the well-known manner.

Figure 3:
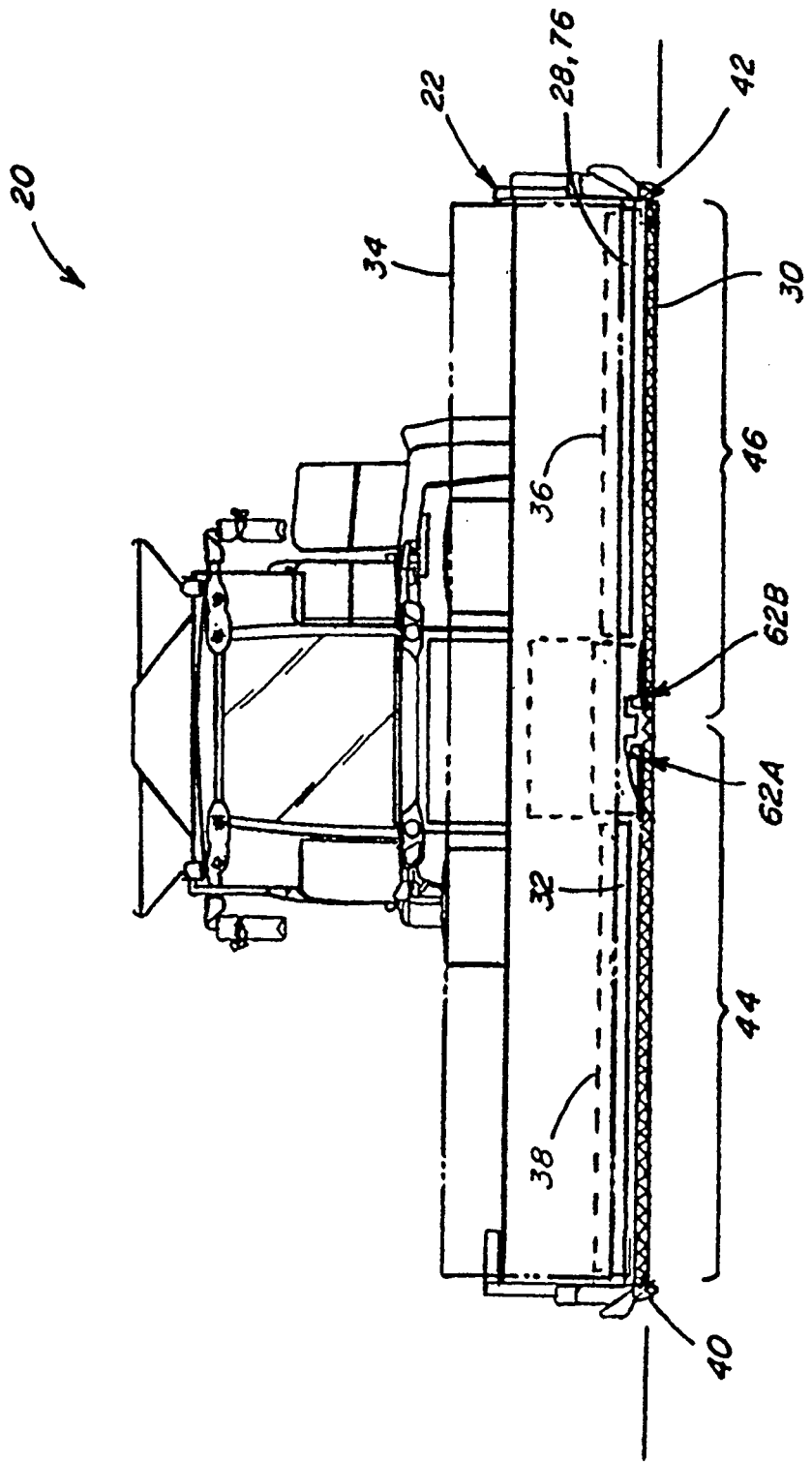
FIG. 3 is a front view of the harvester and header, showing the location of the openings in the header floor and associated knife arms.

Referring more particularly to FIG. 3, sickle 30 extends in a sideward direction along the width of floor 28, between a first side edge portion 40 of the floor, and an opposite second side edge portion 42. Sickle 30 includes an elongate, sidewardly extending first cutter bar assembly 44, and an elongate, sidewardly extending second cutter bar assembly 46 extending in end to end relation to cutter bar assembly 44, cutter bar assemblies 44 and 46 being supported in substantially longitudinally aligned relation adjacent to forward edge portion 32 of floor 28.

Cutter bar assemblies 44 and 46 each include a plurality of sidewardly facing aligned slots 48 through a sidewardly extending array of guards 50 which project forwardly from a stationary bar 52 at sidewardly spaced intervals therealong. Stationary bar 52 extends the length of sickle 30 just forwardly of forward edge portion 32 of floor 28, and guards 50 are mounted to bar 52 with fasteners 54. Bar 52, in turn, is mounted to a frame 56 of header 22 adjacent to forward edge portion 32 by fasteners 54. Each of cutter bar assemblies 44 and 46 supports an elongate knife assembly 58 for reciprocating longitudinal movement within slots 48, each knife assembly 58 having a row of knife sections 60 including oppositely facing, angularly related knife edges which, in conjunction with adjacent guards 50, effects a shearing or cutting action which severs plant stems and stalks or other material captured between the knives and the guards as the knife sections are reciprocatingly moved sidewardly, as denoted by arrow A in FIG. 4.

Figure 4:
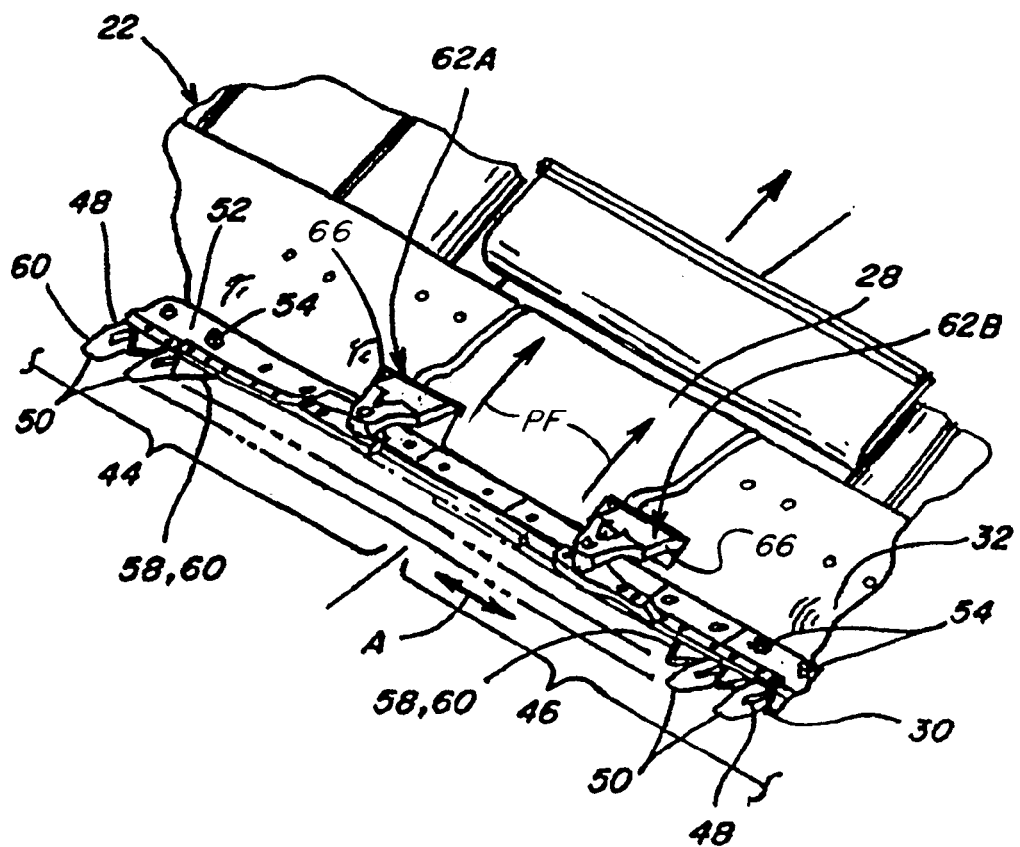
FIG. 4 is a fragmentary perspective view of the header, showing the knife arms extending through the openings of the floor.
Figure 5:
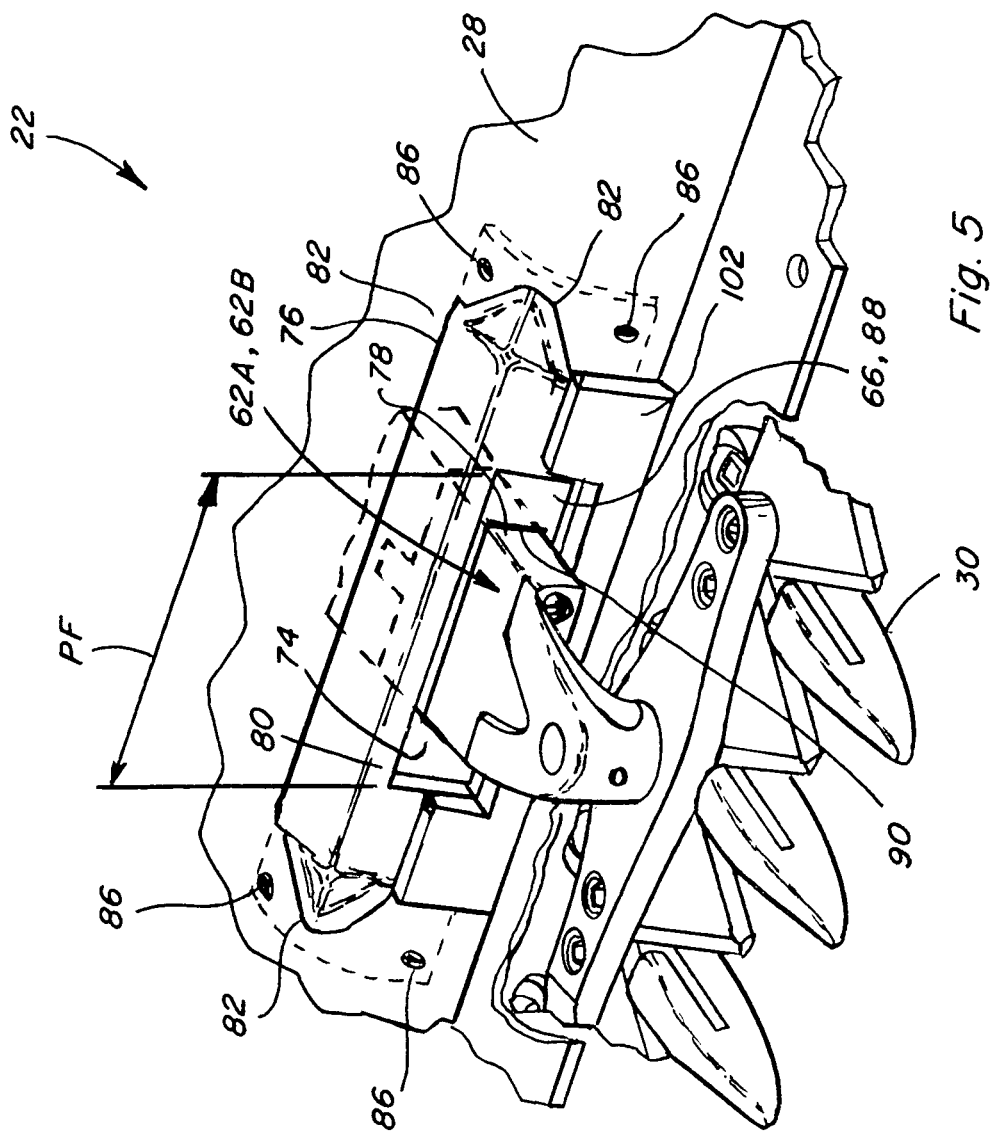
FIG. 5 is an enlarged fragmentary perspective view of the header, showing a floor seal of the invention sealing one of the openings in the floor about a knife arm extending therethrough and connecting with a sickle of the header.
Figure 6:
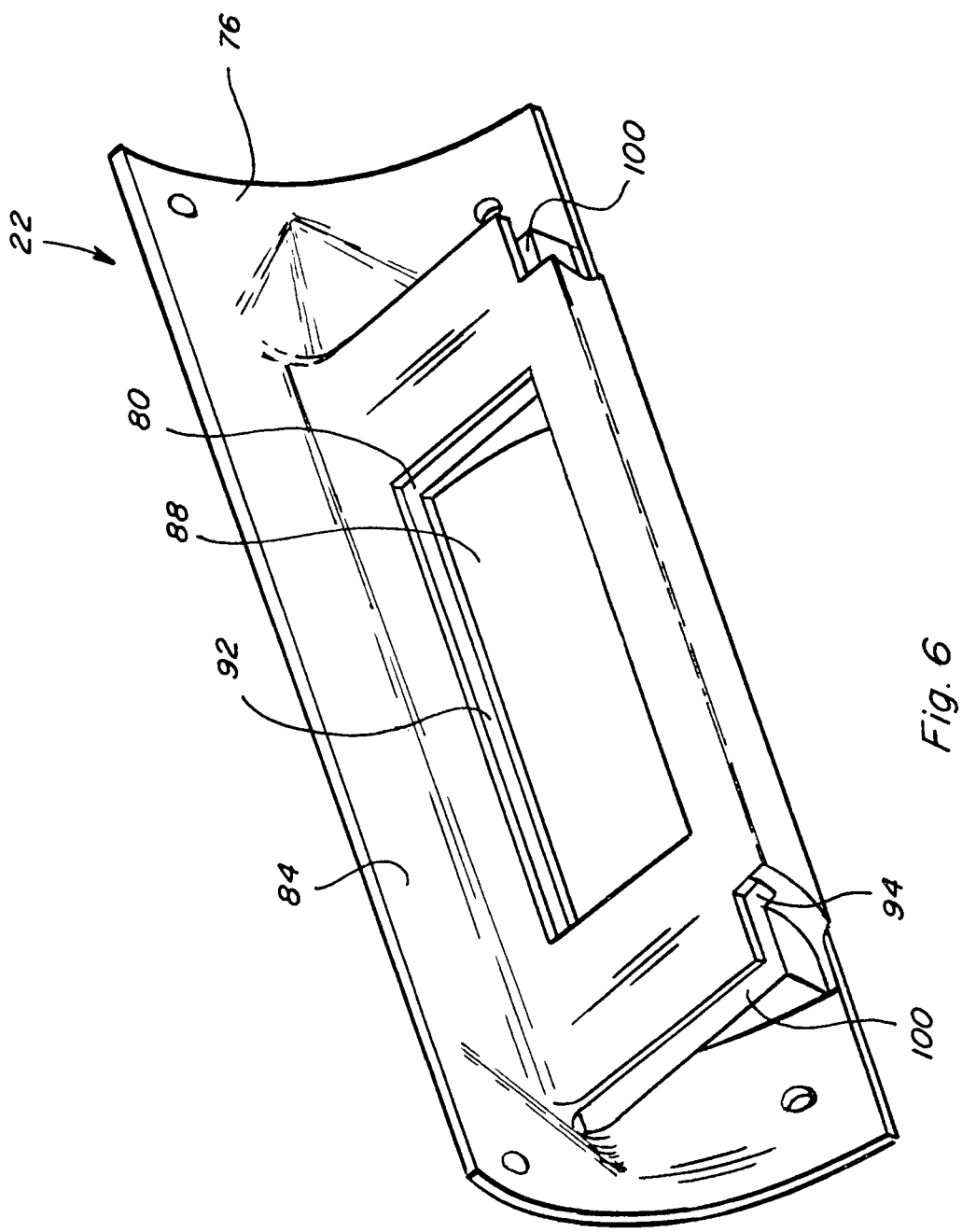
FIG. 6 is an enlarged rear perspective view of aspects of the floor seal of FIG. 5.
Figure 7:
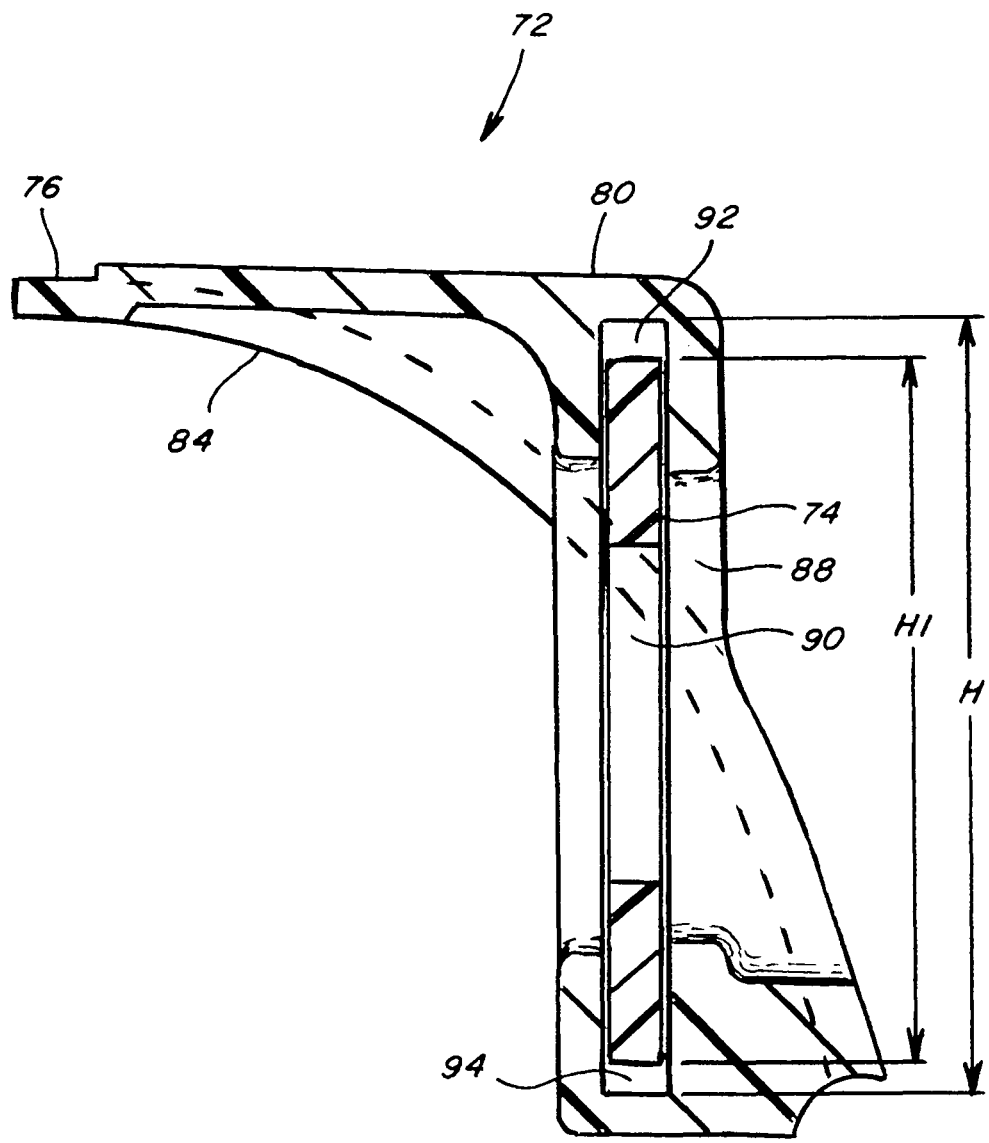
FIG. 7 is a sectional view of aspects of the floor seal of FIG. 5.
Figure 11:
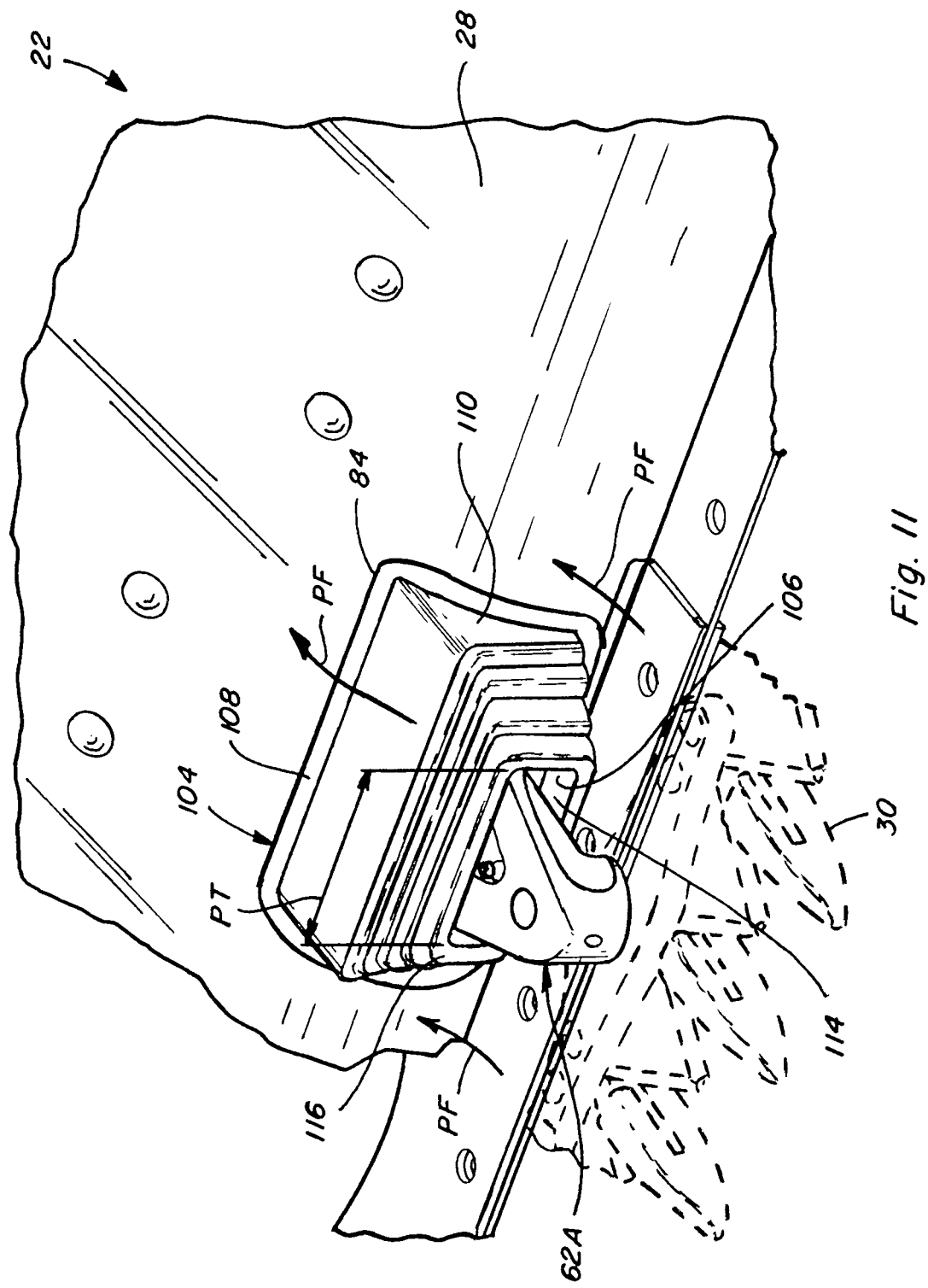
FIG. 11 is a fragmentary sectional view of the header, showing the floor seal of FIG. 10 and associated knife arm and sickle.

Knife assemblies 58 are reciprocatingly driven by first and second knife arms 62A and 62B of a center knife drive, represented by drive 64 in FIG. 11. Knife arms 62A and 62B are illustrated in FIGS. 3 and 4 at a center location on header 22 equidistant between side edge portions 40 and 42 at the opposite ends of the header, although it should be noted that it is contemplated that center knife drive 64 could alternatively be utilized at other locations on a header, and that multiple drives 64 could be used at multiple locations on a header. Center knife drive 64 is preferably located completely within or beneath floor 28 as illustrated in FIG. 11, to reduce interruption of flow of cut plant material thereover and thereabout. Center knife drive 64 can comprise a variety of vertically compact mechanisms to facilitate the location in or under floor 28, such as, but not limited to, low profile or compact epicyclical, crank, and pivoting type apparatus operable to impart a reciprocating sideward motion, or pivoting sideward motion, to the knife assemblies denoted by arrow A. The disclosures and teachings of Cook et al. PCT patent application Serial Nos. PCT/US12/39739 and PCT/US12/39749, both filed May 25, 2012, are hereby incorporated by reference herein in its entirety, as representative non-limiting examples of low profile drive mechanisms that can be utilized with the present invention for achieving the desired cutting action.

Knife arms 62A and 62B project forwardly through openings 66 in or in the vicinity of forward edge portion 32 of floor 28, for connection to the respective knife assemblies 58, and which are moved in a side to side reciprocating motion by drive 64, for effecting the cutting action A. As is evident from the location of knife arms 62A and 62B and openings 66, they will be located directly in the path of the rearward flow of cut plant material over forward edge 32 and onto the upper surface of floor 28 during plant cutting operations, as denoted by arrows PF in FIG. 4. As a result, some loose plant material or residue, including stalks and stems and fragments thereof, grain, and dust, dirt and other loose material, can be expected to enter openings 66. This can be problematic and undesirable, as drive 64 is at least partially contained under an upper cover 70, on which the material can collect or accumulate. This is undesired for several reasons, including as discussed above, that the material can insulate upper cover 70 so as to prevent dissipation of the heat so as to possibly result in damage to the internal mechanism and components of the drive. Also, if sickle 30 is configured to operate in a float mode wherein cutter bar assemblies 44 and 46 are allowed to float upwardly and downwardly relative to floor 28 providing a ground following capability for cutting crops such as soybeans close to the ground, accumulated material can obstruct, limit, and/or prevent full upward movement within the desired range. Stiff and rigid material such as stalks can also become lodged in openings 66 to obstruct movements of the knife arms resulting in increased wear and possible damage.

Referring also to FIGS. 5 through 12, to prevent or limit entry of loose material of flow PF into openings 66 and possible resultant build up of the material on cover 70 and the other problems discussed above, floor 28 of header 22 of combine 20 drive 64 includes floor seals 72 or 104 disposed in covering and sealing relation to openings 66 about knife arms 62A and 62B. By sealing or sealed relation, what is meant is that seals 72 prevent substantially all or all crop material, dust, dirt and the like from passage through the associated opening 66 under typical plant cutting conditions.

Referring more particularly to FIGS. 5 through 9, each floor seal 72 includes an inner peripheral seal element 74 bounded by an outer peripheral seal element 76. Inner peripheral seal element 74 fits about or cooperatively engages an outer peripheral surface 78 of the associated knife arm 62A or 62B forming at least a barrier to entry or substantially sealed condition thereabout to prevent entry of the cut crop and the other loose material therebetween, and is movable side to side with the associated knife arm. Floor seal 72 additionally includes an intermediate cover element 80 extending between inner and outer seal elements 74 and 76, as an enclosure or barrier to passage of loose material between the seal elements while allowing the side to side movements of inner seal element 74 with the associated knife arm 62A or 62B relative to the outer seal element 76.

As representative examples of materials, inner seal element 74 can be of a flexible or semi-flexible material such as a rubber or rubbery polymer, or a harder material if it just fits about the knife arm, and outer seal element 76 can be integral with cover element 80, including being of one-piece or unitary construction, and is preferably of a harder, rigid plastics or metal material.

Seal element 76 is preferably molded or formed to have a profile shape when viewed from the side including an inner flange surface 84 that substantially conforms to the profile shape of portions of floor 28 defining and bounding opening 66, so as to be positionable in abutment therewith for forming the sealed condition. Here, seal element 76 is securable in position on floor 28 with fasteners 86 which can be sheet metal screws, rivets or the like, or using tabs, e.g., wing tabs 82, that can be snapped in place to clamp element 76 to surface 28.

Cover element 80 projects forwardly from seal element 76 in a relatively unobstructive manner to material flow PF, and bounds and defines a forwardly facing aperture 88. Aperture 88 is sized and shaped (here a rectangular shape) to be marginally larger than, and bound, a side to side path of travel, denoted by arrow PT, of the associated knife arm 62A or 62B which passes through the aperture. Inner seal element 74 is sized and shaped to be marginally larger than aperture 88 and is positioned in covering relation thereto about the knife arm. In the embodiment shown, the knife arms have rectangular cross sectional shapes and each seal element 74 has a corresponding rectangular opening 90 of the same or a marginally larger or smaller size for receiving the knife arm in substantially sealed relation thereabout. Again, the sealed condition is for purposes of preventing passage of solid materials, dust and dirt, not necessarily water, moisture and the like. And it should be recognized that opening 90 can be differently shaped as required for forming a sealed condition about the knife arm with which it is used. It can also be observed in this regard that because aperture 88 is substantially directly forwardly facing, it is significantly smaller than opening 66, as it is not located on the curve of floor 28, thereby reducing the area for possible entry of loose material, e.g., in the event of failure or loss of inner seal element 74.

Additionally, seal element 74 is received and supported for side to side movement in sidewardly extending upper and lower slots 92 and 94 bounding upper and lower edges of aperture 88. Slots 92 and 94 preferably have open ends 100, such that material that settles therein can be forced endwardly therefrom by the side edges of the seal element 74 during the side to side movement thereof, providing a self-cleaning capability. As an alternative, slots 92 and 94 can have one or more openings along the length thereof to provide the self-cleaning feature. Here it can be observed that slots 92 and 94 are a vertical height H apart that is optionally a predetermined amount greater than a height H1 of seal element 74 while retaining element 74. This is desirable as it allows relative up and down movements of seal element 74 and cover element 80, to accommodate tilting and up and down movements of the knife arms with the sickle when the header is operated in a float mode, locked in an up position or otherwise differently angularly oriented vertically, as denoted by angle RT in FIG. 10. Because seal element 74 is disposed about the knife arm, it will travel therewith while retained by slots 92 and 94, but the fit can be sufficiently loose to allow forward and rearward movements of the knife arm relative to the seal during any side to side movement thereof resulting from pivotal movements, as discussed in regard to FIG. 12 below.

Figure 8:
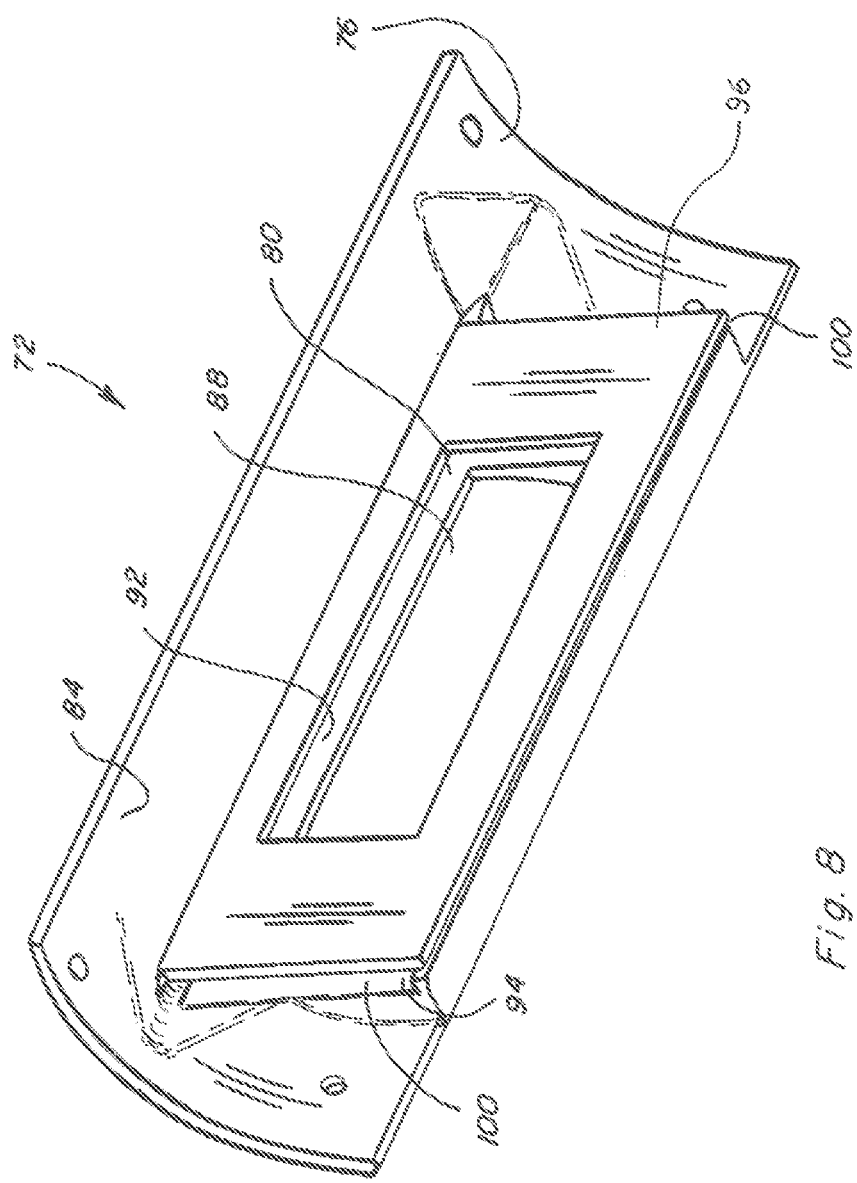
FIG. 8 is an enlarged rear perspective view of an alternative for the floor seal of FIG. 5.
Figure 9:
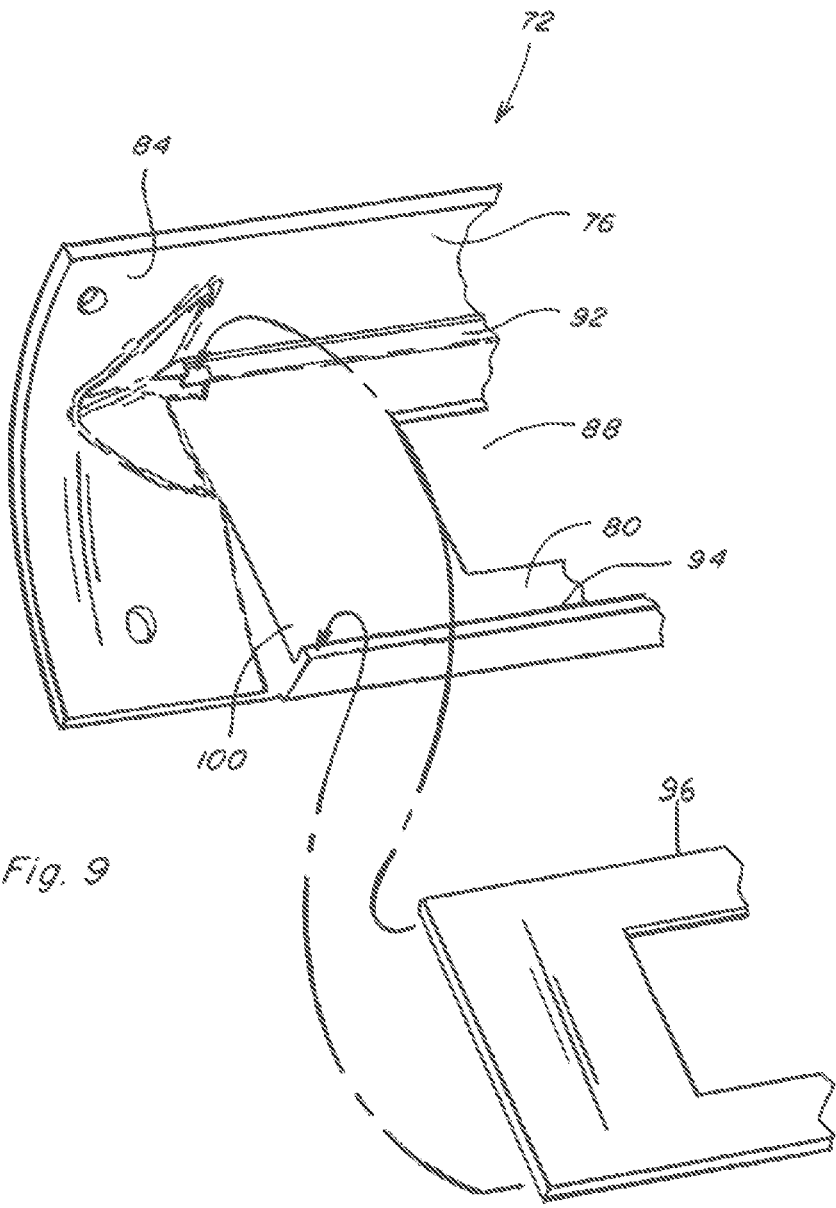
FIG. 9 is an enlarged rear perspective view of the element of FIG. 8, showing attachment of an additional element of the seal thereto.

FIGS. 8 and 9 show an alternative construction of combined outer peripheral seal element 78 and intermediate cover element 80, including an aperture plate 96 that mounts to a rear surface of cover element 80 about aperture 88 to form slots 92 and 94 therewith, leaving opposite open ends 100. Aperture plate 96 can be glued or energy beam welded, e.g., using an ultrasonic beam, in place as desired or required, and is shaped to provide additional support for the moving inner seal element. As an additional optional feature shown in FIG. 5, cover element 80 can include a wear strip 102 of a rigid, hard material along a lower periphery thereof below the knife arm to protect the cover and outer seal element 76 from wear and other damage from loose material that collects thereagainst and is driven back and forth therealong by the sickle during the plant cutting operation.

Figure 10:
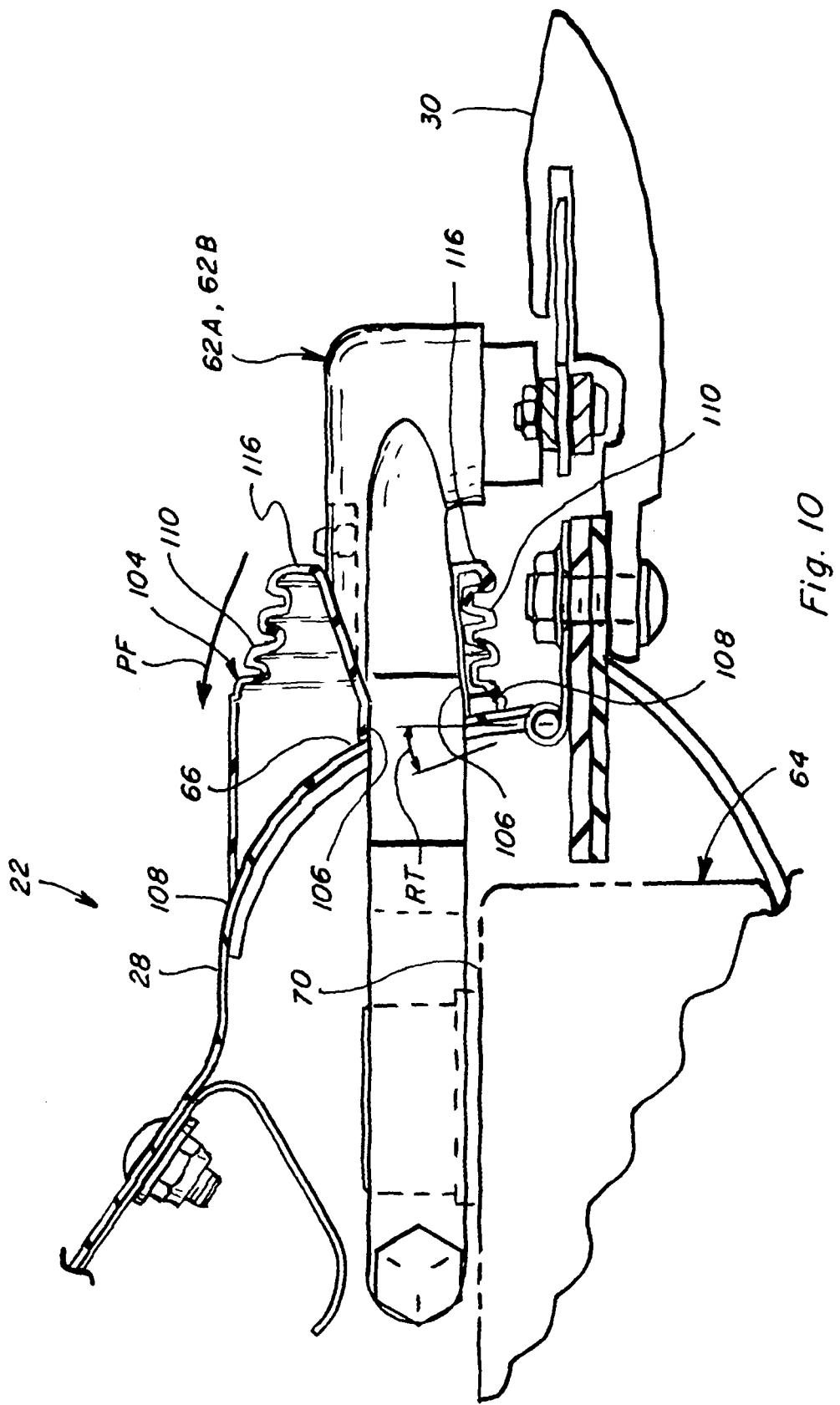
FIG. 10 is an enlarged fragmentary perspective view of the header, showing another embodiment of a floor seal of the invention sealing one of the openings in the floor about a knife arm extending therethrough and connecting with the sickle of the header.
Figure 12:
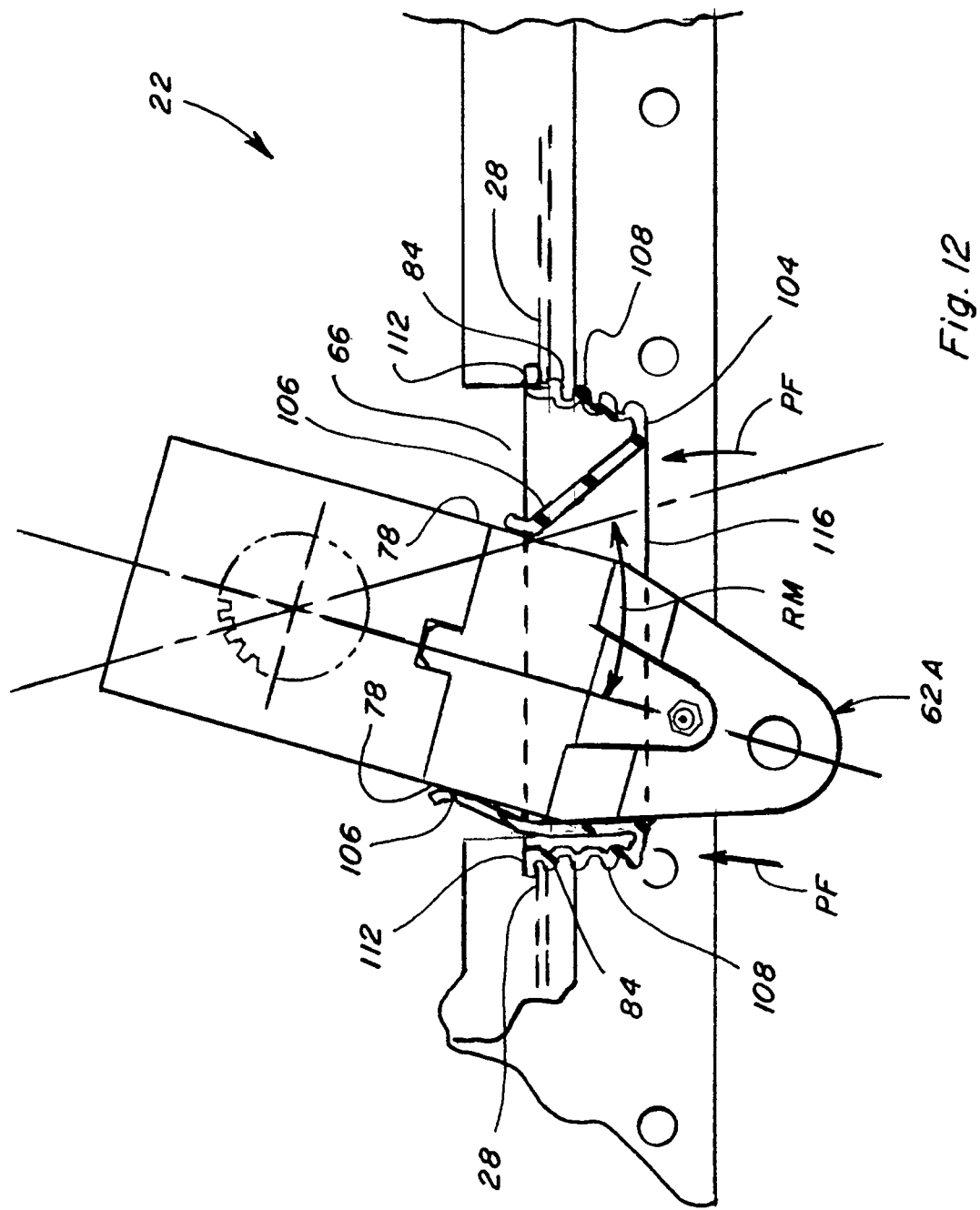
FIG. 12 is a fragmentary top view of the header showing the knife arm through the header floor and the floor seal of FIG. 10 in cross section to show operation of the seal when the knife arm is in a sidewardly oriented position.

Referring more particularly to FIGS. 10 through 12, floor seal 104 is an alternative to floor seal 72. Each floor seal 104 includes an inner peripheral seal element 106 bounded by an outer peripheral seal element 108. Inner peripheral seal element 106 cooperatively engages outer peripheral surface 78 of the associated knife arm 62A or 62B forming a substantially sealed condition or barrier thereabout to prevent entry of the cut crop and the other loose material therebetween, and is movable side to side with the associated knife arm. Floor seal 104 additionally includes an intermediate cover element 110 extending between inner and outer seal elements 106 and 108, as an enclosure or barrier to passage of loose material between the seal elements while allowing the side to side movements of inner seal element 106 with the associated knife arm 62A or 62B relative to the outer seal element 108, and also forward and rear movements of the knife arm as a result of its pivoting action.

As representative examples of construction and materials, floor seal 104 can be of unitary one piece construction, of a flexible or semi-flexible material such as a rubber or rubbery polymer, with predetermined areas of greater stiffness, e.g., fabric reinforced, and other areas of greater flexibility, e.g., less reinforcement or thinner. Outer seal element 108 is preferably molded or formed to have a profile shape when viewed from the side including an inner flange surface 84 that substantially conforms to the profile shape of an edge 82 of floor 28 defining and bounding opening 66, so as to be positionable in abutment therewith for forming the sealed condition. Here, seal element 108 can additionally have a matching companion flange surface 112 (FIG. 12) spaced a distance about equal to the thickness of edge 82, rearwardly of flange surface 84, defining a groove between surfaces 84 and 112 for cooperatively receiving the edge of floor 28 around opening 66 for holding surface 84 in sealed relation therewith. Additionally or alternatively, adhesives, and/or mechanical fasteners, e.g., screws, rivets, could be used for this purpose.

Cover element 110 projects forwardly from seal element 76 and bounds and defines a forwardly facing aperture 114. Aperture 114 is sized and shaped (again a rectangular shape) to be marginally larger than, and bound, a side to side path of travel, denoted by arrow PT, of the associated knife arm 62A or 62B which passes through the aperture. Inner seal element 106 is located in aperture 114 extending rearwardly from a forwardmost edge of cover 110 and extends about the knife arm. As in the previous embodiment, the knife arms have rectangular cross sectional shapes and each seal element 106 has a corresponding rectangular opening 90 of the same or a marginally larger or smaller size for receiving the knife arm in substantially sealed relation thereabout. Again, the sealed condition is for purposes of providing a barrier preventing passage of solid materials, dust and dirt, not necessarily water, moisture and the like. And it should be recognized that opening 90 can be differently shaped as required for forming a sealed condition about the knife arm with which it is used.

It can be further observed that the surfaces of cover element 110 taper convergingly in the forward direction. This is advantageous as it reduces the plowing of cut crop material by the cover element and improves the flow of the material past floor seal 104. Cover element 110 terminates at a relatively narrow forwardmost rectangular lip 116, that is the juncture with seal element 106 which extends rearwardly therefrom within aperture 114. As a result, cover element 110 and seal element 106 illustrated have a combined V-shape in section that subtends an angle that will vary as a function of the side to side position of the associated knife arm. The side to side movement of the knife arm will be accommodated by the resilient flexure of both seal element 106 and cover element 110, so that outer seal element 108 is not disengaged from edge 82, and inner seal element 106 is not significantly disengaged from the knife arm, as illustrated in FIG. 12. Here, it can be observed that the knife arm shown is pivoted to an end point of its side to side motion and floor seal accommodates about a 30 degree overall range of angular motion of the knife arm, denoted by arrow RM. This range of motion, as well as limited forward and reward motion resulting from the arcuate path of the knife arm resulting from it pivoting action, is largely accommodated by relative flexure of inner seal element 106 and cover element 110 at and about lip 116, which is limited so that those elements are still sufficiently stiff to resist significant deformation and/or damage from contact with cut crop and other material of flow PF. It can also be observed that cover element 110 includes corrugations that give it strength yet sufficient flexibility in the sideward direction for moving with the side to side movements of the associated knife arm.

Here, it should also be noted that the upper and lower surfaces of cover element 110 are also corrugated and angularly related to the upper and lower surfaces of inner seal element 106. This likewise accommodates relative up and down movements of the knife arm and the floor, and tilting of the knife arm, as denoted by angle RT in FIG. 10, for accommodating sickle float and flexibility. Still further, it should be noted that the upper surface of cover element 110 has a rearward extent that is greater than the lower surface thereof to accommodate the curvature of floor 28 at the location of opening 66, and also facilitate flow PF of cut crop material thereover.

As a variation of floor seal 104, inner peripheral seal element 106 can be located at or adjacent to lip 116 to eliminate the V-shape, and so as to be configured to form the sealed condition more forwardly about the associated knife arm, and cover element 110 can be configured to have sufficient flexibility such that the forward end thereof will move with the knife arm, while being sufficiently rigid and tough so as resist wear and damage from contact with the cut plant matter.

As an additional feature, floor seals 72 and 104 of the invention are quickly and easily removable and replaceable when the knife arm is removed and serviced.

In light of all the foregoing, it should thus be apparent to those skilled in the art that there has been shown and described a novel floor seal for a knife arm for driving a sickle of a plant cutting machine. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A floor seal for a header of an agricultural equipment comprising:
   a floor having a forwardly facing opening through which a knife arm extends for side to side reciprocating movement that drives a sickle of the agricultural equipment during-a plant cutting operation,
   a stationary outer peripheral seal element that cooperatively engages a peripheral edge of the floor about the opening, to form a substantially sealed condition thereabout,
   an inner peripheral seal element bounded by the outer peripheral seal element the inner peripheral seal element cooperatively engaging an outer peripheral surface of the knife arm (62A, 62B), to form a barrier to entry of loose material thereabout and movable side to side with the knife arm and
   an intermediate cover element that provides a forwardly facing enclosure that withholds passage of loose material between the seal elements while allowing for the side to side movements of the inner peripheral seal element with the knife arm relative to the outer peripheral seal element during the plant cutting operation.

2. The floor seal of claim 1, wherein the inner peripheral seal element is bounded by and located in an aperture of the intermediate cover element.

3. The floor seal of claim 2, wherein the inner peripheral seal element is carried in at least one sidewardly extending slot along an edge of the aperture for side to side movement relative to the cover element.

4. The floor seal of claim 3, wherein the slot has an open portion such that the side to side movements of the inner peripheral seal element will push collected loose material endwardly from the slot.

5. The floor seal of claim 3, comprising two of the slots disposed above and below the aperture, respectively, and wherein the slots are spaced apart sufficiently to allow limited upward and downward relative movements of the inner peripheral seal element and the cover element to facilitate relative upward and downward movements of the knife arm and the floor.

6. The floor seal of claim 2, wherein the cover element has a generally tapered shape that extends forwardly from the outer peripheral seal element convergingly toward the aperture and the inner peripheral seal element is recessed in the aperture so as to be at least partially shielded by the cover element.

7. The floor seal of claim 1, wherein the cover element includes a strip of a rigid, hard material along a lower periphery thereof, below the knife arm.

8. The floor seal of claim 1, wherein the outer peripheral seal element and the cover element comprise a rigid material, and the inner peripheral seal element comprises a flexible material.

9. The floor seal of claim 8, wherein the rigid material comprises a hard plastics material, and the flexible material comprises a rubbery material.

10. A floor seal for a forwardly facing opening through a floor of a plant cutting machine through which a knife arm extends for side to side reciprocating movement for driving a sickle of the machine as the machine is moved forwardly for performing a plant cutting operation, comprising:
    sides that define an opening for a floor of a header hosted by an agricultural harvester; the opening facilitates reciprocating motion of a knife arm extending through the opening;
    an outer peripheral seal element engaged with a peripheral edge of the floor about the opening and carrying a cover element in covering relation to the opening about the knife arm, the cover element defining and bounding a forwardly facing aperture containing the knife arm; and
    an inner peripheral seal element carried in the aperture by the cover element, bounding and forming a barrier to passage of loose material about the knife arm and movable side to side thereby relative to the outer peripheral seal element and the cover element.

11. The floor seal of claim 10, wherein the aperture has a sideward extent about equal to a length of the side to side movement of the knife arm.

12. The floor seal of claim 11, wherein the inner peripheral seal element has a sideward extent greater than the sideward extent of the aperture and is carried in at least one sidewardly extending slot along an edge of the aperture for side to side movement relative to the cover element.

13. The floor seal of claim 12, wherein the slot has an open portion such that the side to side movements of the inner peripheral seal element will push collected loose material endwardly from the slot.

14. The floor seal of claim 13, comprising two of the slots disposed above and below the aperture, respectively, and wherein the slots are spaced apart sufficiently to allow limited upward and downward relative movements of the inner peripheral seal element and the cover element to facilitate relative upward and downward movements of the knife arm and the floor.

15. The floor seal of claim 10, wherein the cover element has a generally tapered shape that extends forwardly from the outer peripheral seal element convergingly toward the aperture, and the inner peripheral seal element is recessed in the aperture so as to be at least partially shielded by the cover element.

16. The floor seal of claim 10, wherein the outer peripheral seal element and the cover element comprise a rigid material, and the inner peripheral seal element comprises a flexible material.

17. The floor seal of claim 16, wherein the rigid material comprises a hard plastics material, and the flexible material comprises a rubbery material.

18. The floor seal of claim 10, wherein the cover element includes a strip of a rigid, hard material along a lower periphery thereof, below the knife arm.

* * * * *